(12) United States Patent
Maeng et al.

(10) Patent No.: US 12,030,363 B2
(45) Date of Patent: Jul. 9, 2024

(54) AIR CONDITIONER FOR VEHICLE

(71) Applicant: Hanon Systems, Daejeon (KR)

(72) Inventors: Chan Joo Maeng, Daejeon (KR); Young Keun Kim, Daejeon (KR); Ki Man Jeon, Daejeon (KR); Hyun Kwon Jung, Daejeon (KR); Gyu Ik Han, Daejeon (KR)

(73) Assignee: Hanon Systems, Daejeon (KR)

( * ) Notice: Subject to any disclaimer, the term of this patent is extended or adjusted under 35 U.S.C. 154(b) by 149 days.

(21) Appl. No.: 17/765,672

(22) PCT Filed: Nov. 25, 2020

(86) PCT No.: PCT/KR2020/016753
§ 371 (c)(1),
(2) Date: Mar. 31, 2022

(87) PCT Pub. No.: WO2021/107582
PCT Pub. Date: Jun. 3, 2021

(65) Prior Publication Data
US 2022/0339988 A1    Oct. 27, 2022

(30) Foreign Application Priority Data

Nov. 28, 2019    (KR) .................. 10-2019-0155017

(51) Int. Cl.
*B60H 1/00*    (2006.01)

(52) U.S. Cl.
CPC ..... *B60H 1/00692* (2013.01); *B60H 1/00064* (2013.01); *B60H 1/00842* (2013.01);
(Continued)

(58) Field of Classification Search
CPC ............ B60H 1/00692; B60H 1/00064; B60H 1/00842; B60H 1/00835; B60H 2001/002; B60H 2001/00721; B60H 2001/00135
See application file for complete search history.

(56) References Cited

U.S. PATENT DOCUMENTS

| 6,453,991 B1 * | 9/2002 | Tsurushima ....... B60H 1/00064 165/42 |
| 9,636,968 B2 * | 5/2017 | Makita ............... B60H 1/00021 |

(Continued)

FOREIGN PATENT DOCUMENTS

| JP | 2001-270320 A | 10/2001 |
| JP | 2009001067 A | 1/2009 |

(Continued)

*Primary Examiner* — Marc E Norman
(74) *Attorney, Agent, or Firm* — Norton Rose Fulbright US LLP; James R. Crawford

(57) ABSTRACT

Disclosed is a vehicle air conditioner capable of increasing the aft flow effective region of an inner flow path by reducing the space occupied by support parts of doors for opening/closing a plurality of regions. The vehicle air conditioner comprises: an air-conditioning case in which an air flow path is formed; and a cooling heat exchanger and a heating heat exchanger provided in the air flow path of the air-conditioning case, wherein the air flow path is partitioned and divided into a plurality of regions, and has a plurality of doors for opening/closing each region and a shaft for driving the doors, and the distance between one door and the shaft is different from the distance between another door and the shaft.

14 Claims, 11 Drawing Sheets

(52) U.S. Cl.
CPC .................. *B60H 2001/002* (2013.01); *B60H 2001/00721* (2013.01)

(56) References Cited

U.S. PATENT DOCUMENTS 11,331,975 B2 * 5/2022 Suzuki ............... B60H 1/00021
2009/0241574 A1 10/2009 Ozeki et al.

FOREIGN PATENT DOCUMENTS

| | | | |
|---|---|---|---|
| JP | 2012144214 A | 8/2012 |
| JP | 2013144510 A | 7/2013 |
| JP | 2018076051 A | 5/2018 |
| JP | 2018122630 A | 8/2018 |
| KR | 10-2010-0137702 A | 12/2010 |
| KR | 101220971 B1 | 1/2013 |
| KR | 10-2019-0058838 A | 5/2019 |

* cited by examiner

PRIOR ART

AIR CONDITIONER FOR VEHICLE

CROSS REFERENCE TO RELATED APPLICATIONS

This application is a national phase under 35 U.S.C. § 371 of International Application No. PCT/KR2020/016753 filed Nov. 25, 2020, which claims the benefit of priority from Korean Patent Application No. 10-2019-0155017 filed on Nov. 28, 2019. The entire contents of these applications are incorporated herein by reference in their entirety.

TECHNICAL FIELD

The present invention relates to an air conditioner for a vehicle and, more specifically, to an air conditioner for a vehicle, which has doors for dividing an air passage into a plurality of regions and opening and closing the corresponding region, and a support structure thereof.

BACKGROUND ART

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for a cooling action and a heater core for a heating action inside an air-conditioning case, and selectively blows the air cooled by the evaporator or heated by the heater core toward parts of the interior of the vehicle.

Especially, in order to secure defogging performance and maintain a high-performance heating during heating, a two-layer air conditioner has been developed. In order to defrost windshields while driving with heat in winter, cold outdoor air with low humidity is effective, but it causes drop of indoor temperature.

The two-layer air conditioner substantializes a two-layer air flow of indoor air and outdoor air by supplying outdoor air to the upper part of the vehicle and by circulating indoor air to the lower part of the vehicle, so as to effectively defrost using fresh outdoor air with low humidity supplied to the upper part and to maintain high-performance heating by providing fresh outdoor air to passengers and providing warm indoor air to the lower part.

FIG. 1 is a sectional view illustrating a conventional air conditioner for a vehicle, and FIG. 2 is a schematic front sectional view illustrating the conventional air conditioner for a vehicle. The conventional air conditioner for a vehicle can perform three-zone independent air conditioning control while being in a two-layered type. That is, the air conditioning device for a vehicle divides an air passage inside an air conditioning case into an upper passage and a lower passage to maintain high heating performance while securing defogging performance during heating, and can perform independent temperature control to a front driver seat, a front passenger seat, and a rear seat.

Hereinafter, the lateral direction in FIG. 1 means a vehicle back-and-forth direction, and the lateral direction in FIG. 2 means a vehicle width direction.

Referring to FIGS. 1 and 2, the conventional air conditioner for a vehicle includes an air conditioning case 10 having an air passage formed therein and an air outlet formed at an exit. The air outlet is composed of a front seat air outlet for discharging air to the front seat of the vehicle and a rear seat air outlet for discharging air to the rear seat of the vehicle. The front seat air outlet includes a defrost vent 11, a face vent 12, and a front seat floor vent 13, and the rear seat air outlet includes a console vent 14 and a rear seat floor vent 15.

A plurality of doors are provided inside the air conditioning case 10. The doors include: a defrost door 21 for adjusting the opening degree of the defrost vent 11; a face door 22 for adjusting the opening degree of the face vent 12; a floor door 23 for adjusting the opening degree of the front seat floor vent 13; and a rear seat mode door 24 for adjusting the opening degree of the console vent 14 and the rear seat floor vent 15.

A blower unit is disposed at an entrance of the air conditioning case 10 in order to selectively introduce indoor air and outdoor air. An evaporator 2 and a heater core 3 are sequentially provided in the air passage of the air conditioning case 10 in an air flow direction. An electric heater 4, such as a PTC, is further provided downstream of the heater core 3. The air passage of the air conditioning case 10 is divided into an upper passage 51 and a lower passage 52 by a partition wall 40.

The upper passage 51 is divided into an upper left passage 81 and an upper right passage 82 in the vehicle width direction by a first partition wall 91. The lower passage 52 is partitioned into a lower left passage 83, a lower center passage 84, and a lower right passage 85 in the vehicle width direction by a second partition wall 92 and a third partition wall 93.

An upper temperature door 61 is provided in the upper passage 51, and a lower temperature door 62 is provided in the lower passage 52. The upper temperature door 61 and the lower temperature door 62 are provided between the evaporator 2 and the heater core 3 to control an amount of air passing through the heater core 103 and an amount of air bypassing the heater core 103.

The upper temperature door 61 includes an upper left temperature door 61a for adjusting the opening degree of the upper left passage 81, and an upper right temperature door 61b for adjusting the opening degree of the upper right passage 82. The lower temperature door 62 includes: a lower left temperature door 62a for adjusting the opening degree of the lower left passage 83; a lower center temperature door 62b for adjusting the opening degree of the lower center passage 84; and a lower right temperature door 62c for adjusting the opening degree of the lower right passage 85.

FIG. 3 is a plan sectional view illustrating the inside of the air conditioning case of the conventional air conditioner for a vehicle, and FIG. 4 is an enlarged sectional view illustrating the doors and support parts of FIG. 3.

Referring to FIGS. 3 and 4, the lower temperature door 62 is arranged in a straight line in the vehicle width direction. In other words, the lower temperature door 62 includes a lower left temperature door 62a, a lower center temperature door 62b, and a lower right temperature door 62c, which are arranged in parallel in the vehicle width direction. The lower temperature door 62 is slidably mounted in the air conditioning case 10 by a plurality of the support parts.

Each lower temperature door 62 slides by rotation of a door shaft 68. The door shaft 68 is spaced apart from the lower temperature door 62 at a predetermined distance and is rotatably provided in the air conditioning case 10. The door shafts 68 are individually rotated by a plurality of actuators so that the lower left temperature door 62a, the lower center temperature door 62b, and the lower right temperature door 62c are individually driven.

The support parts include a first support part 67a, a second support part 67b, a third support part 67c, and a fourth support part 67d. The lower left temperature door 62a is slidably provided between the first support part 67a and the second support part 67b, and the lower center temperature door 62b is slidably provided between the second support part 67b and the third support part 67c, and the lower right temperature door 62c is slidably provided between the third support part 67c and the fourth support part 67d.

The conventional air conditioner for a vehicle has a disadvantage in that the air passage inside the air conditioning case becomes narrow and the air volume is reduced since the plurality of support parts for supporting the plurality of doors must be provided.

For instance, considering both structures supporting the temperature doors, when the entire length (e) in the width direction is 273 mm, the length (a) of the first support part is 8 mm, the length (b) of the second support part is 18 mm, the length (c) of the third support part is 18 mm, and the length (d) of the fourth support part is 8 mm, and the entire length of the support part occupies 52 mm. In this instance, the length of one passage is approximately 73.7 mm. As described above, the passage inside the air conditioning case becomes narrow due to the length of the support parts for supporting the plurality of doors.

DISCLOSURE

Technical Problem

Accordingly, the present invention has been made in an effort to solve the above-mentioned problems occurring in the prior arts, and it is an object of the present invention to provide an air conditioner for a vehicle, which can increase an effective region of an air flow in an internal passage by reducing a space that support parts of doors opening and closing a plurality of regions occupy.

Technical Solution

To achieve the above objects, the present invention provides an air conditioner for a vehicle, which includes: an air conditioning case having an air passage formed therein; and a cooling heat exchanger and a heating heat exchanger provided in the air passage of the air conditioning case, wherein the air passage is divided into a plurality of regions, and comprises a plurality of doors for opening and closing each region and shafts for respectively driving the doors, and a distance between one door and the shaft is different from a distance between another door and the shaft.

Moreover, at least one of the plurality of regions supplies air to the rear seat region of the vehicle, and a distance between the door and the shaft for opening and closing the rear seat region is different from a distance between another door and the shaft.

Furthermore, the distance between the door and the shaft for opening and closing the rear seat region is larger than the distance between another door and the shaft.

Additionally, the air conditioner for a vehicle further includes support parts for respectively supporting the doors to be able to slide, wherein the support part of one door is partially overlapped with the support part of another door.

In addition, the doors are arranged in a vehicle width direction, and the support part of one door is disposed at a different position in a vehicle back-and-forth direction with respect to the support part of another door.

Moreover, the one door is disposed in two or more stages in the vehicle back-and-forth direction with respect to another door.

Furthermore, an end portion of the one door is partially overlapped in the vehicle width direction with respect to an end portion of the another door.

Additionally, the shaft has a gear part for transmitting driving power to the door, and the gear part of the shaft for driving the one door is larger in diameter than the gear part of the shaft for driving another door.

In addition, the shaft has a gear part for transmitting driving power to the door, and the gear part of one door, which is engaged with the gear part of the shaft, protrudes further toward the gear part of the shaft than the gear part of another door.

Moreover, the one door includes: a flat plate part formed in a thin plate shape; a gear part formed on one surface of the flat plate part and engaged with the gear part of the shaft; and a first stiffness reinforcing part formed at a position corresponding to the gear part on the other surface of the flat portion having the gear part formed thereon and recessed in parallel with the protruding direction of the gear part.

Furthermore, the one door includes: at least one second stiffness reinforcing part protruding from one surface of the flat plate part, on which the gear part is formed, and extending at right angles to a sliding direction which is a longitudinal direction of the gear part; and a third stiffness reinforcing part formed at a position corresponding to the second stiffness reinforcing part on the other surface of the flat plate part having the gear part formed thereon, and formed to be recessed in parallel with the protruding direction of the second stiffness reinforcing part.

Additionally, the internal air passage of the air conditioning case is horizontally divided into an upper passage and a lower passage by a partition wall so as to be formed in a two-layered type, and is configured to perform an independent temperature control of three zones, namely, a front driver seat, a front passenger seat, and a rear seat region.

In addition, the upper passage is divided into an upper left passage and an upper right passage in a vehicle width direction by a first partition wall, and the lower passage is divided into a lower left passage and a lower center passage in the vehicle width direction by a second partition wall and a third partition wall, and the one door is provided in a lower center passage.

Moreover, the air flowing through the lower center passage is discharged to at least one among a console vent and a rear seat floor vent for discharging air to the rear seat region of the vehicle.

Furthermore, an upper temperature door arranged in the upper passage and a lower temperature door arranged in the lower passage are disposed between the cooling heat exchanger and the heating heat exchanger. The upper temperature door includes an upper left temperature door for adjusting the opening degree of the upper left passage and an upper right temperature door for adjusting the opening degree of the upper right passage. The lower temperature door includes a lower left temperature door for adjusting the opening degree of the lower left passage, a lower center temperature door for adjusting the opening degree of the lower center passage, and a lower right temperature door for adjusting the opening degree of the lower right passage.

Additionally, the air conditioner for a vehicle further includes a support member for slidably supporting the door in the air passage of the air conditioning case. The support member includes a first support member, a second support member, a third support member, and a fourth support member, wherein the lower left temperature door is slidably provided between the first support member and the second support member, the lower center temperature door is slidably provided between the second support member and the third support member, and the lower right temperature door is slidably provided between the third support member and the fourth support member. The second support member and the third support member are configured such that the support parts of both doors are partially overlapped with each other.

Moreover, the lower left temperature door, the lower center temperature door, and the lower right temperature door have the same width direction length, or the lower left temperature door and the lower right temperature door have the same width direction length.

In another aspect of the present invention, there is provided an air conditioner for a vehicle including: an air conditioning case having an air passage formed therein; and a cooling heat exchanger and a heating heat exchanger provided in the air passage of the air conditioning case, wherein the air passage is divided into a plurality of regions, and comprises a plurality of doors for opening and closing each region and support parts for slidably supporting the doors. The support part of one door is formed to be partially overlapped with the support part of another door.

Advantageous Effects

The air conditioner for a vehicle according to the present invention reduces a space occupied by the support parts of the doors opening and closing the plurality of regions in order to increase an effective region of an air flow of an internal passage, thereby reducing ventilation resistance and increasing an air volume to enhance air conditioning performance and enabling components to be commonly used to prevent an increase of manufacturing costs.

MODE FOR INVENTION

Hereinafter, a technical configuration of an air conditioner for a vehicle according to the present invention will be described in detail.

Figure 5:
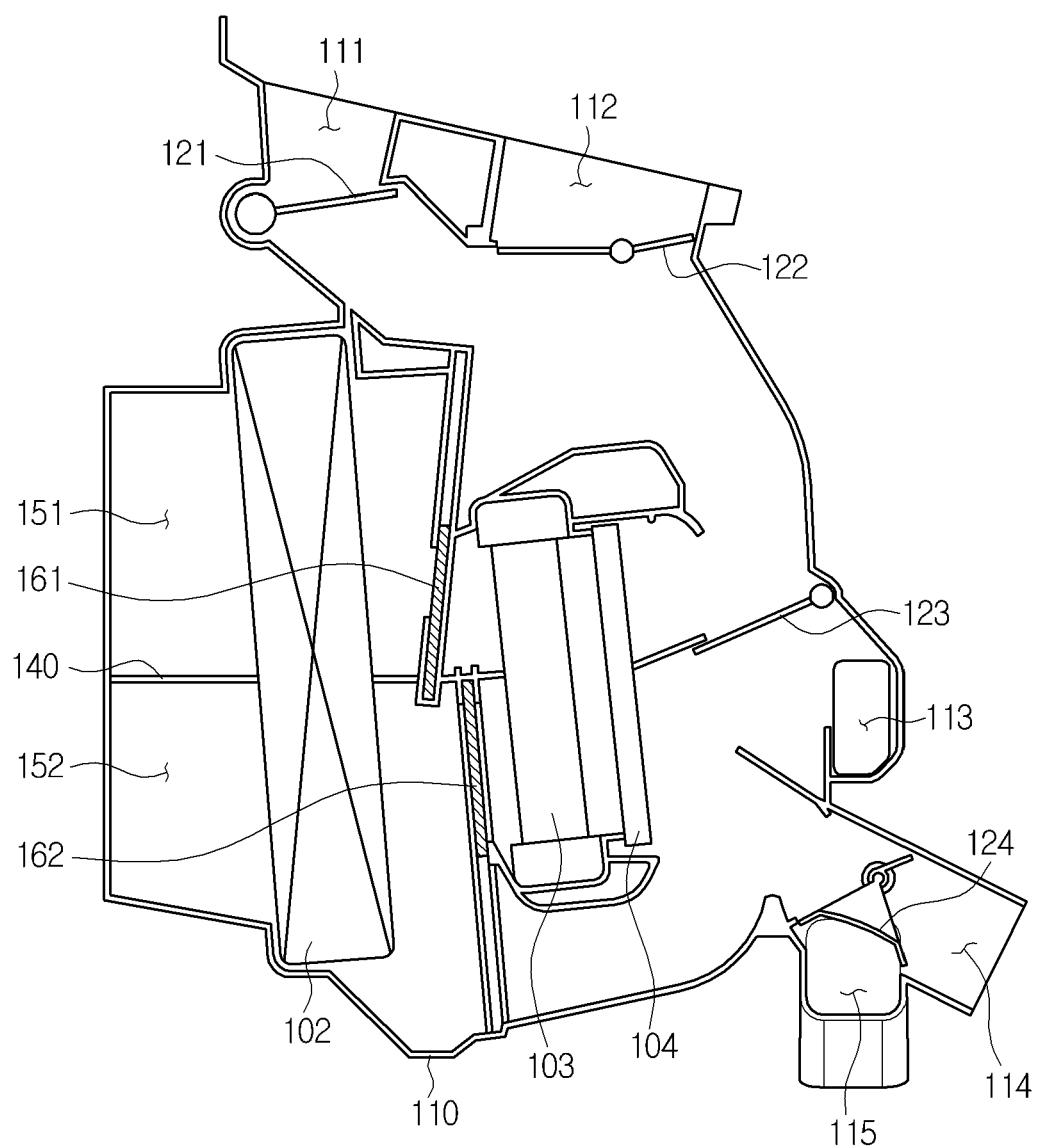
FIG. 5 is a sectional view illustrating an air conditioner for a vehicle according to an embodiment of the present invention.
Figure 6:
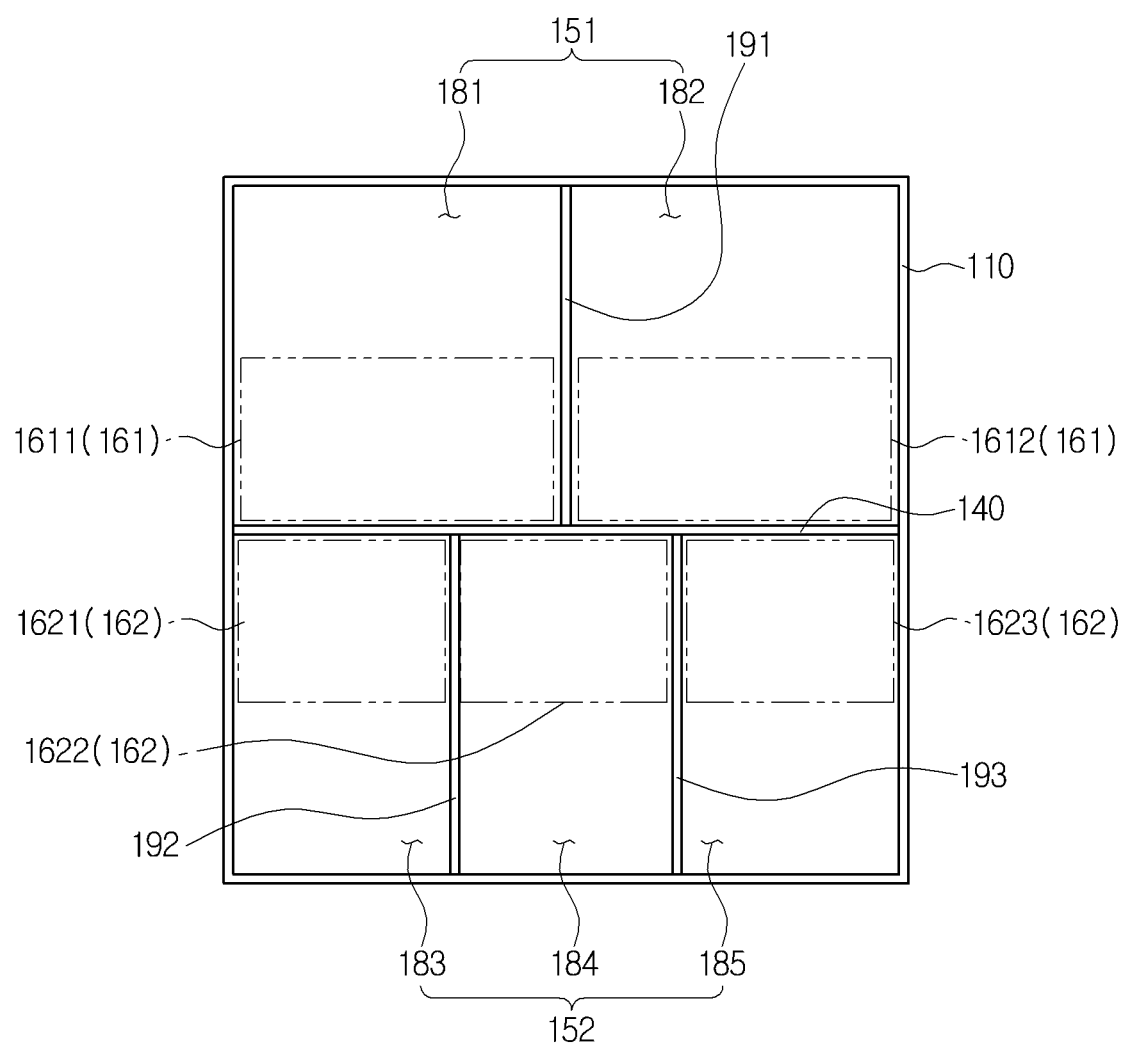
FIG. 6 is a schematically front sectional view of the air conditioner for a vehicle according to the embodiment of the present invention.

FIG. 5 is a sectional view illustrating an air conditioner for a vehicle according to an embodiment of the present invention, and FIG. 6 is a schematically front sectional view of the air conditioner for a vehicle according to the embodiment of the present invention.

In the following description, the lateral direction in FIG. 5 means a vehicle back-and-forth direction, and the lateral direction in FIG. 6 means a vehicle width direction.

Referring to FIGS. 5 and 6, the air conditioner for a vehicle according to an embodiment of the present invention includes an air conditioning case 110 having an air passage formed therein and an air outlet formed at an exit. The air outlet includes a front seat air outlet for discharging air to the front seat of the vehicle and a rear seat air outlet for discharging air to the rear seat of the vehicle. The front seat air outlet includes a defrost vent 111, a face vent 112, and a front seat floor vent 113. The rear seat air outlet includes a console vent 114 and a rear seat floor vent 115.

A plurality of doors are provided inside the air conditioning case 110. The doors includes: a defrost door 121 for adjusting the opening degree of the defrost vent 111; a face door 122 for adjusting the opening degree of the face vent 112; a floor door 123 for adjusting the opening degree of the front seat floor vent 113; and a rear seat mode door 124 for adjusting the opening degree of the console vent 114 and the rear seat floor vent 115.

A blower unit is provided at an inlet of the air conditioning case 110, and the blower unit selectively introduces indoor air and outdoor air. A cooling heat exchanger and a heating heat exchanger are sequentially provided in an air flow direction of the air conditioning case 110. The cooling heat exchanger includes an evaporator 102, and the heating heat exchanger includes a heater core 103 and an electric heater 104, such as a PTC.

The air passage of the air conditioning case 110 is divided into an upper passage 151 and a lower passage 152 by a partition wall 140. The air introduced into an indoor air passage of the blower unit flows to the lower passage 152 of the air conditioning case 110, and air introduced into the outdoor air passage of the blower unit flows to the upper passage 151 of the air conditioning case 110. The partition wall 140 is extended upstream of the evaporator 102, between the evaporator 102 and the heater core 103, and downstream of the heat transfer heater 104 approximately horizontally, so that the air passage is divided into the upper passage 151 and the lower passage 152 by the partition wall 140.

The internal air passage of the air conditioning case 110 is horizontally divided into the upper passage 151 and the lower passage 152 by the partition wall 140 to be formed in a two-Layer type, and can control temperature of three zones, namely, a front driver seat, a front passenger seat, and a rear seat region.

In this instance, the two-layered vehicle air conditioner can maintain high heating performance while securing Defogging performance during heating. That is, for defogging during heating, outdoor air is supplied to the upper part of the vehicle, and the indoor air is circulated in the lower part, thereby effectively removing frost using the fresh and low humid outdoor air supplied to the upper part, providing fresh outdoor air to a passenger, and supplying warm indoor air to the lower part to maintain high heating performance.

In detail, the upper passage 151 is divided into an upper left passage 181 and an upper right passage 182 in the vehicle width direction by a first partition wall 191. That is, the first partition wall 191 is formed in the vertical direction, and divides the upper passage 151 into two in the vehicle width direction. The lower passage 152 is divided into a lower left passage 183, a lower center passage (184), and a lower right passage (185) in the vehicle width direction by a second partition wall 192 and a third partition wall 193. That is, the second partition wall 192 and the third partition wall 193 are formed in the vertical direction, and trisect the lower passage 152 in the vehicle width direction.

An upper temperature door 161 is provided in the upper passage 151, and a lower temperature door 162 is provided in the lower passage 152. The upper temperature door 161 and the lower temperature door 162 are disposed between the evaporator 102 and the heater core 103 to adjust an amount of air passing through the heater core 103 and an amount of air bypassing the heater core 103. The upper passage 151 has an upper cold air passage bypassing the heater core 103 and an upper warm air passage passing through the heater core 103, and the lower passage 152 has a lower warm air passage passing through the heater core 103 and a lower cold air passage bypassing the heater core 103. The upper cold air passage, the upper warm air passage, the lower warm air passage, and the lower cold air passage are sequentially formed from the upper part to the lower part.

The upper temperature door 161 includes an upper left temperature door 1611 for adjusting the opening degree of the upper left passage 181, and an upper right temperature door 1612 for adjusting the opening degree of the upper right passage 182. The lower temperature door 162 includes a lower left temperature door 1621 for adjusting the opening degree of the lower left passage 183, and a lower center temperature door 1622 for adjusting the opening degree of the lower center passage 184, and a lower right temperature door 1623 for adjusting the opening degree of the lower right passage 185.

The air flowing in one among the upper left passage 181 and the upper right passage 182 is discharged to the defrost vent 111 or the face vent 112 of the front driver seat of the vehicle, and air flowing in the other one is discharged to the defrost vent 111 or the face vent 112 of the front passenger seat of the vehicle. Additionally, the air flowing in the lower left passage 183 and the lower right passage 185 is discharged to the front seat floor vent 113 of the vehicle or discharged to the front seat air outlet by communicating with the upper passage 151.

Moreover, the air flowing through the lower center passage 184 is discharged to at least one of the console vent 114 and the rear seat floor vent 115 for discharging air to the rear seat region of the vehicle.

Figure 7:
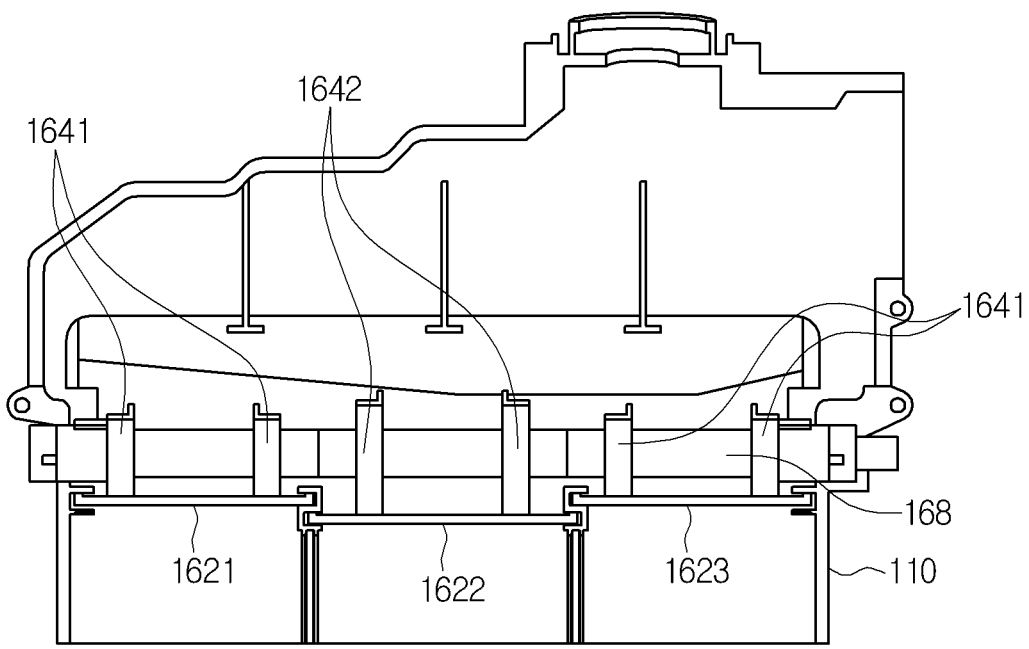
FIG. 7 is a plan sectional view illustrating the inside of an air conditioning case of the air conditioner for a vehicle according to the embodiment of the present invention.
Figure 8:
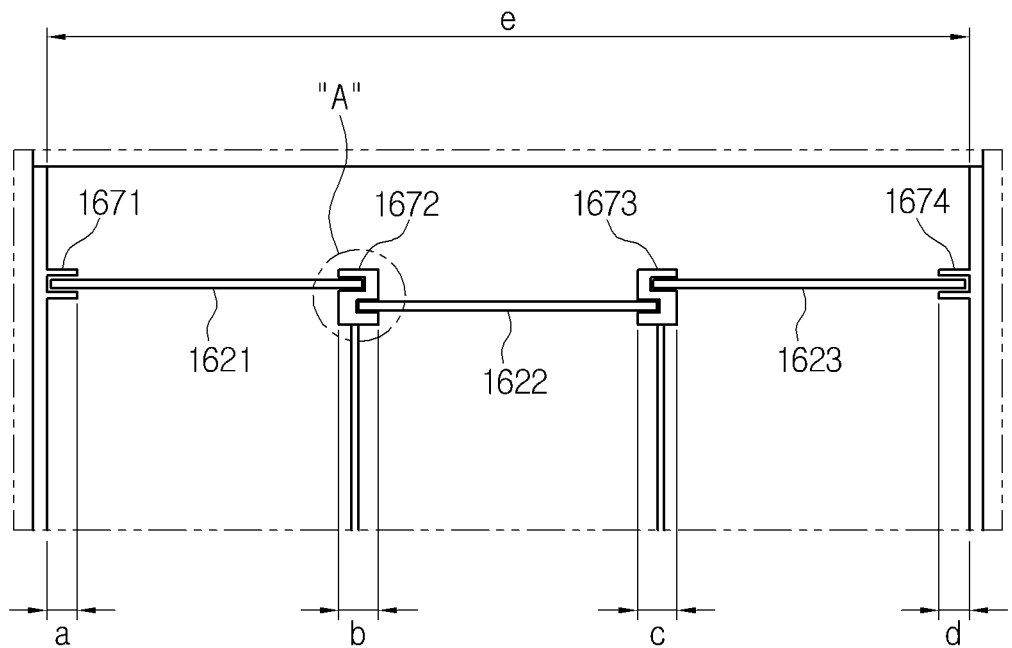
FIG. 8 is an enlarged sectional view of doors and support parts of FIG. 7.
Figure 9:
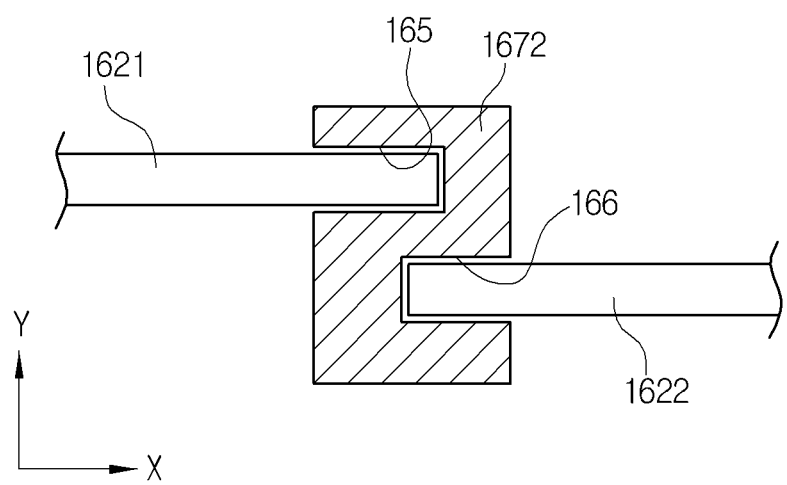
FIG. 9 is an enlarged sectional view of "A" of FIG. 8.

FIG. 7 is a plan sectional view illustrating the inside of an air conditioning case of the air conditioner for a vehicle according to the embodiment of the present invention, FIG. 8 is an enlarged sectional view of doors and support parts of FIG. 7, and FIG. 9 is an enlarged sectional view of "A" of FIG. 8.

Referring to FIGS. 7 to 9, the lower temperature door 162 is arranged in the vehicle width direction. As described above, the air passage is divided into the plurality of regions and includes the plurality of doors for opening and closing each region. In addition, shafts 168 for driving the doors 168 are provided.

Each lower temperature door 162 slides by rotation of the shaft 168. The shaft 168 is spaced apart from the lower temperature door 162 at a predetermined distance and is rotatably provided in the air conditioning case 110. The shaft 168 is located on a single axis line, and the lower left temperature door 1621, the lower center temperature door 1622, and the lower right temperature door 1623 can be individually controlled by a plurality of actuators to individually rotate and drive.

In this instance, the distance between one door and the shaft 168 is formed to differ from the distance between the other doors and the shaft 168. Furthermore, as described above, at least one among the plurality of regions supplies air to the rear seat region of the vehicle. The distance between the door opening and closing the rear seat region and the shaft 168 is formed to differ from the distance between the other doors and the shaft 168. That is, the distance between the door opening and closing the rear seat region and the shaft 168 is greater than the distance between the other doors and the shaft 168.

Additionally, the air conditioner for a vehicle includes a support part for supporting the door to slide. The support part of one door is formed to be overlapped with the support part of the other door. In addition, the support part of one door is arranged at a different position in the vehicle back-and-forth direction with respect to the support part of the other door. In other words, one door is arranged in two or more stages in the vehicle back-and-forth direction with respect to the other door.

The one door is the lower center temperature door 1622 and the other doors are the lower left temperature door 1621 and a lower right temperature door 1623. In other words, the one door is provided in the lower center passage 184. Moreover, the air passage of the air conditioning case 110 includes a support member for supporting the door to slide.

The support member includes a first support member 1671, a second support member 1672, a third support member 1673, and a fourth support member 1674. The lower left temperature door 1621 is slidably provided between the first support member 1671 and the second support member 1672, and the lower center temperature door 1622 is slidably provided between the second support member 1672 and the third support member 1673, and the lower right temperature door 1623 is slidably provided between the third support member 1673 and the fourth support member 1674.

The second support member 1672 and the third support member 1673 partially overlap the support parts of both sides of the door. That is, as shown in FIG. 9, the second support member 1672 partially overlaps the support part 165 of the lower left temperature door 1621 and the support part 166 of the lower center temperature door 1622.

In detail, the support part 166 of the lower center temperature door 1622 is arranged at a different position in the vehicle back-and-forth direction with respect to the support part 165 of the lower left temperature door 1621. That is, the support part 166 of the lower center temperature door 1622 is disposed behind the support part 165 of the lower left temperature door 1621. In other words, the support part 166 of the lower center temperature door 1622 is arranged in two stages in the vehicle back-and-forth direction with respect to the support part 165 of the lower left temperature door 1621.

The lower left temperature door 1621 and the lower right temperature door 1623 are arranged on a straight line, and the lower center temperature door 1622 is disposed behind the lower left temperature door 1621 and the lower right temperature door 1623. The support part of the lower center temperature door 1622 is formed to be partially overlapped with the support part of the lower left temperature door 1621 and the support part of the lower right temperature door 1623.

In this instance, the lower left temperature door 1621, the lower center temperature door 1622, and the lower right temperature door 1623 can have the same width direction length. Therefore, the three temperature doors can be used commonly so as to reduce manufacturing costs. Moreover, it is also possible that the lower left temperature door 1621 and the lower right temperature door 1623 are formed to have the same width direction length and the lower center temperature door 1622 is formed to be longer or shorter in the width direction length than the lower left temperature door 1621 and the lower right temperature door 1623.

If an air volume of the rear seat outlet must be increased, the width direction length of the lower center temperature door 1622 is formed to be longer than the width direction length of the lower left temperature door 1621 and the lower right temperature door 1623. If an air volume of the rear seat outlet must be decreased due to excess of the air volume of the rear seat outlet, the width direction length of the lower center temperature door 1622 is formed to be shorter than the width direction length of the lower left temperature door 1621 and the lower right temperature door 1623.

Through such a configuration, the lower left temperature door 1621 and the lower right temperature door 1623 can be used commonly so as to reduce manufacturing costs and to appropriately optimize the air volume of the rear seat outlet.

The air conditioner for a vehicle according to an embodiment of the present invention can reduce the space occupied by the support parts of the doors to increase an effective air flow region of the internal passage since the support part of the lower center temperature door 1622 is formed to be partially overlapped with the support parts of the lower left temperature door 1621 and the lower right temperature door 1623, thereby enhancing air conditioning performance by reducing ventilation resistance and increasing the air volume. Furthermore, the air conditioner for a vehicle according to an embodiment of the present invention does not increase manufacturing costs by enabling the common use of the components.

For example, when the total length (e) of the internal passage is 273 mm in the width direction, the length (a) of the first support member is 8 mm, the length (b) of the second support member is 9.6 mm, the length (c) of the third support member is 9.6 mm, the length (d) of the fourth support member is 8 mm, and the entire length of the support member is 35.2 mm. In this instance, the length of one passage is approximately 79.3 mm.

Figure 1:
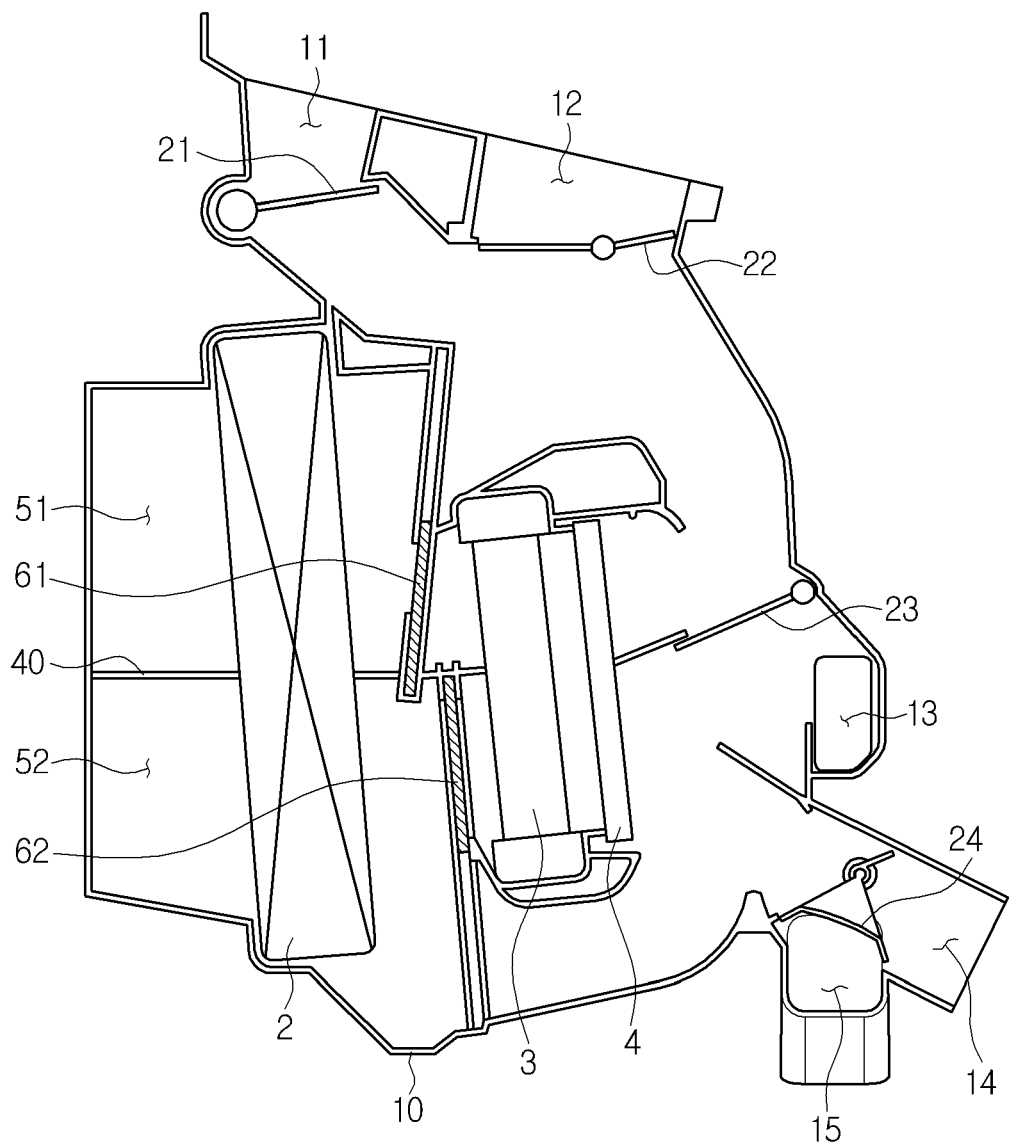
FIG. 1 is a sectional view of a conventional air conditioner for a vehicle.
Figure 2:
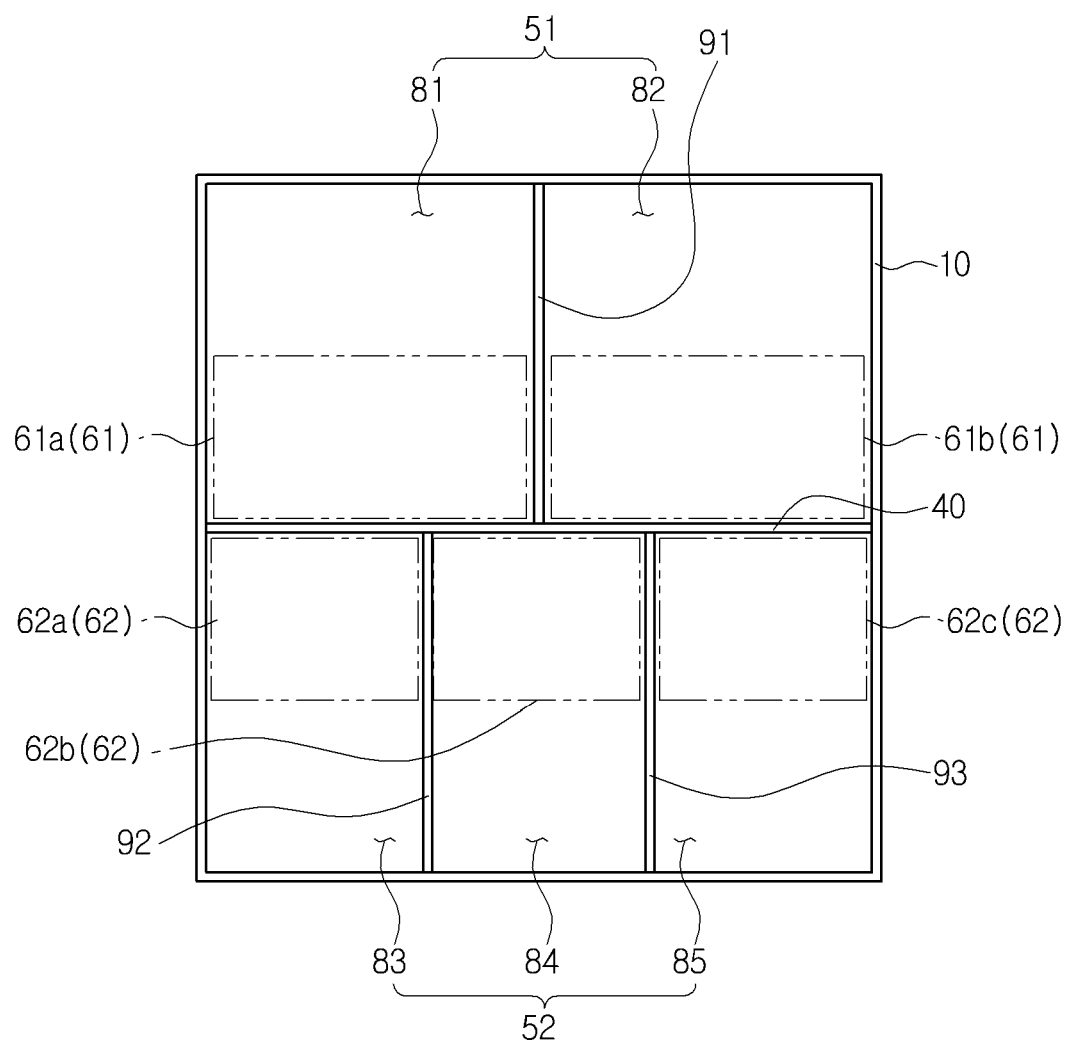
FIG. 2 is a schematically front sectional view of the conventional air conditioner for a vehicle.
Figure 3:
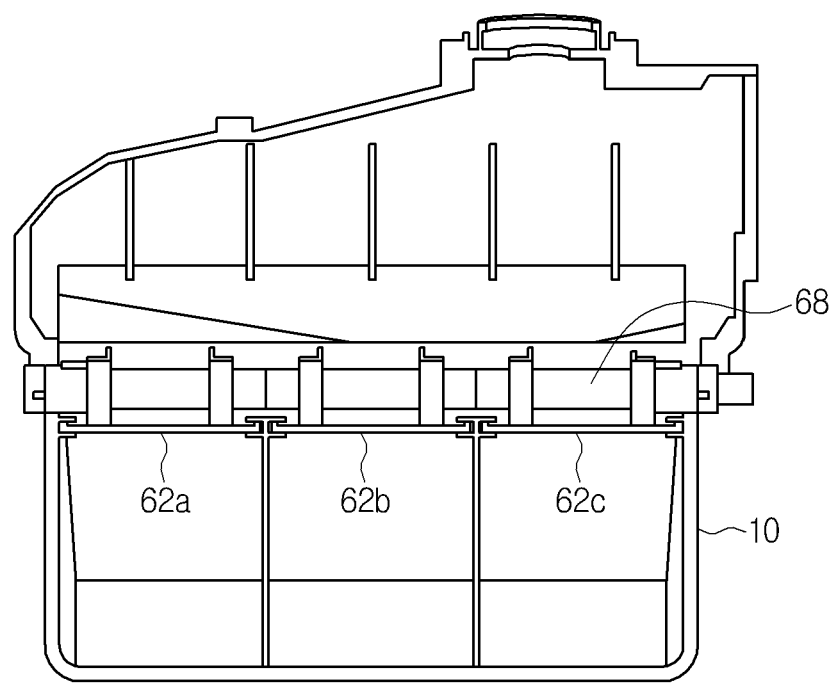
FIG. 3 is a plan sectional view illustrating the inside of an air conditioning case of the conventional air conditioner for a vehicle.
Figure 4:
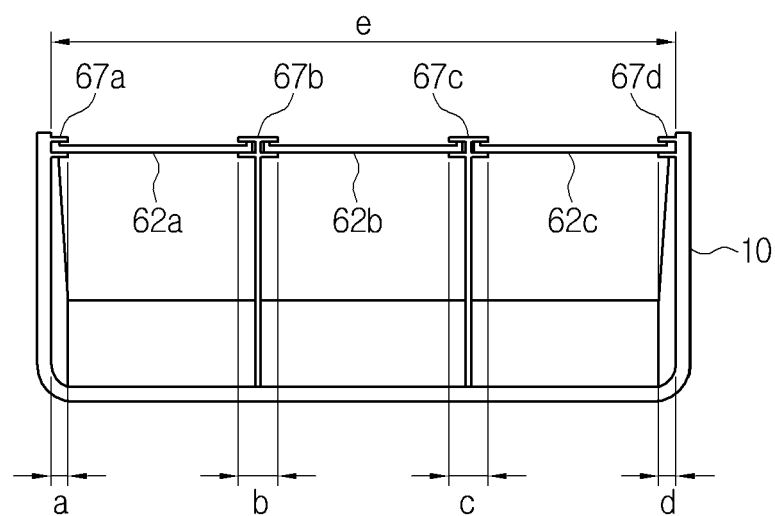
FIG. 4 is an enlarged sectional view of doors and support parts of FIG. 3.

When an embodiment of the present invention is compared to the example described in FIG. 4 of the prior art, the length of one passage is increased in the range from 73.7 mm to 79.3 mm, and the opening of the temperature door increases approximately 7.6%.

Figure 10:
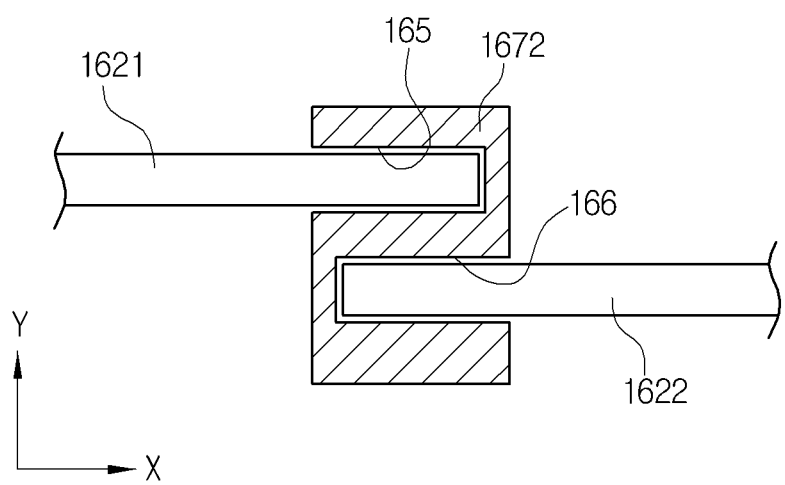
FIG. 10 is a view illustrating a modification of FIG. 9.

Meanwhile, an end portion of one door can be formed to be partially overlapped in the vehicle width direction with respect to an end portion of the other doors. FIG. 10 illustrates a modification of FIG. 9. Referring to FIG. 10, the support part 166 of the lower center temperature door 1622 is partially overlapped with the support part 165 of the lower left temperature door 1621, and an end portion of the lower center temperature door 1622 is partially overlapped with an end portion of the lower left temperature door 1621.

In other words, compared with the embodiment of FIG. 9, the overlapped regions of the support part 166 of the lower center temperature door 1622 and the support part 165 of the lower left temperature door 1621 of the embodiment of FIG. 10 are larger than those of the embodiment of FIG. 9. Through such a configuration, since the occupied region of the support member can be further reduced, the opening region of the doors can be increased.

Two embodiments are now described for driving the lower center temperature door 1622 which is disposed farther away from the shaft 168 than the lower left temperature door 1621 and the lower right temperature door 1623.

Referring to FIG. 7 as a first embodiment, the shaft 168 includes a gear part for transmitting driving power to the door. In this instance, the gear part of the shaft driving one door is larger in diameter than the gear part of the shaft driving another door. In detail, the gear part includes: a side gear part 1641 for driving the lower left temperature door 1621 and the lower right temperature door 1623; and a center gear part 1642 for driving the lower center temperature door 1622. The center gear part 1642 is larger in diameter than the side gear part 1641.

Through such a configuration, the lower center temperature door can be effectively operated when only the diameter of the gear part of the shaft is designed differently without changing the shape of the door.

Figure 11:
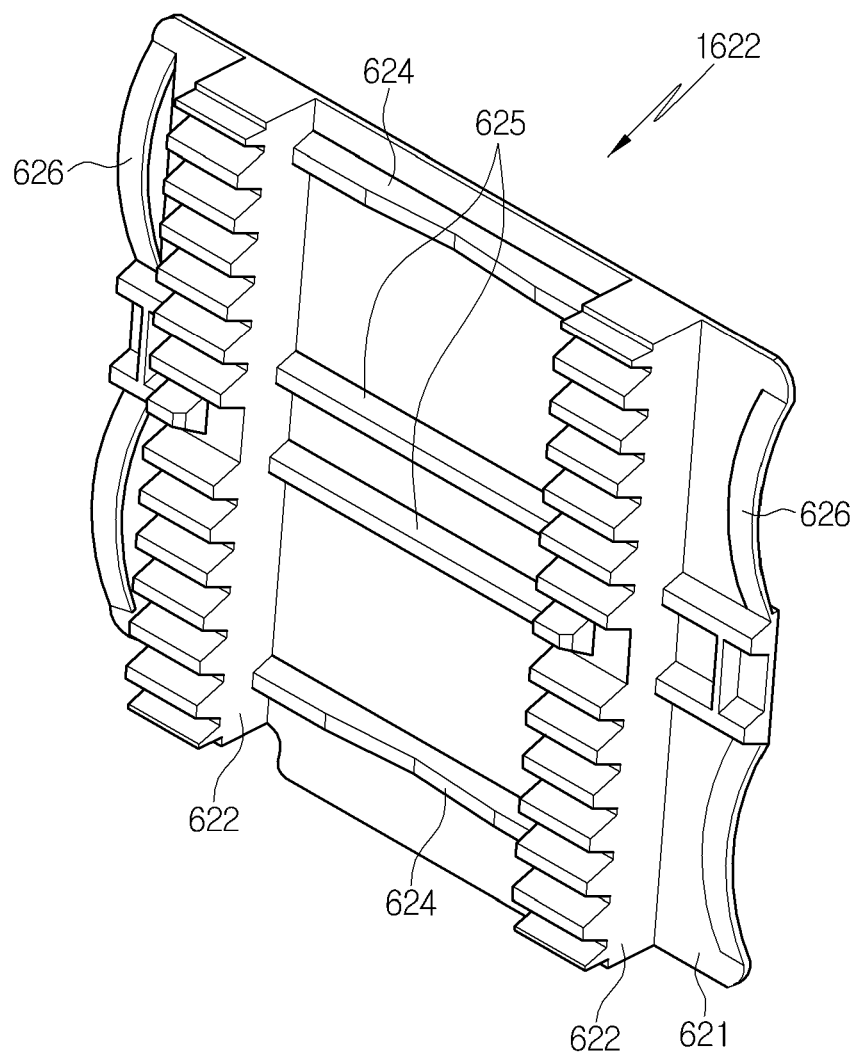
FIG. 11 is a perspective view illustrating a lower center temperature door of the air conditioner for a vehicle according to another embodiment of the present invention.
Figure 12:
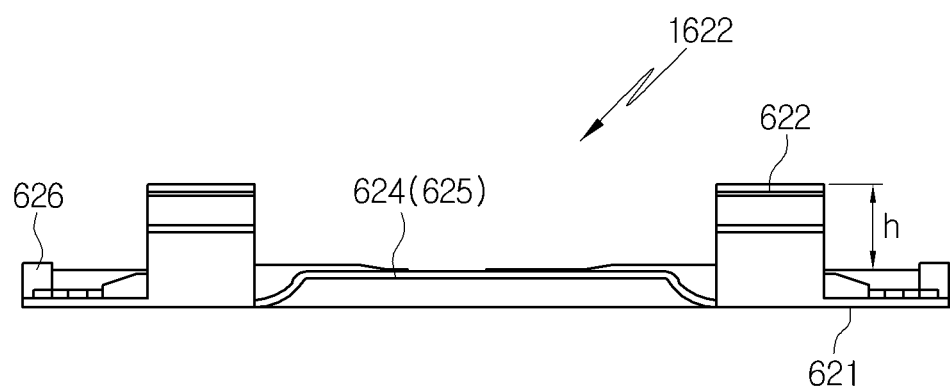
FIG. 12 is a plan view of FIG. 11.
Figure 13:
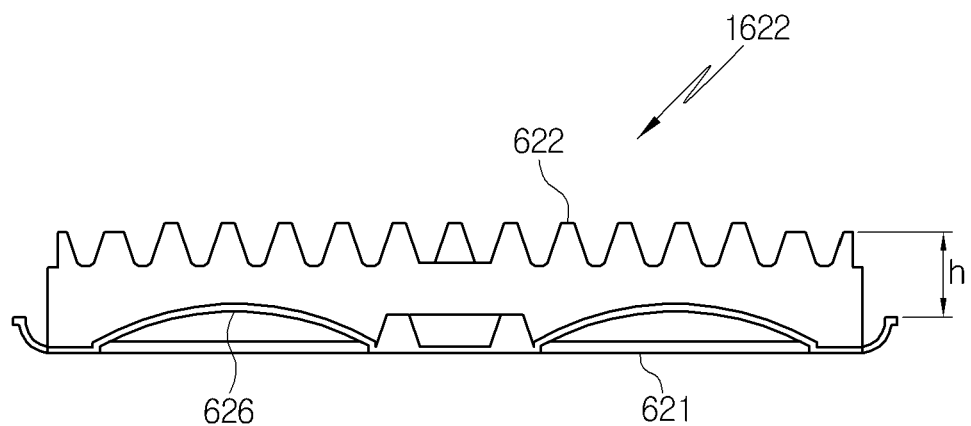
FIG. 13 is a side view of FIG. 11.
Figure 14:
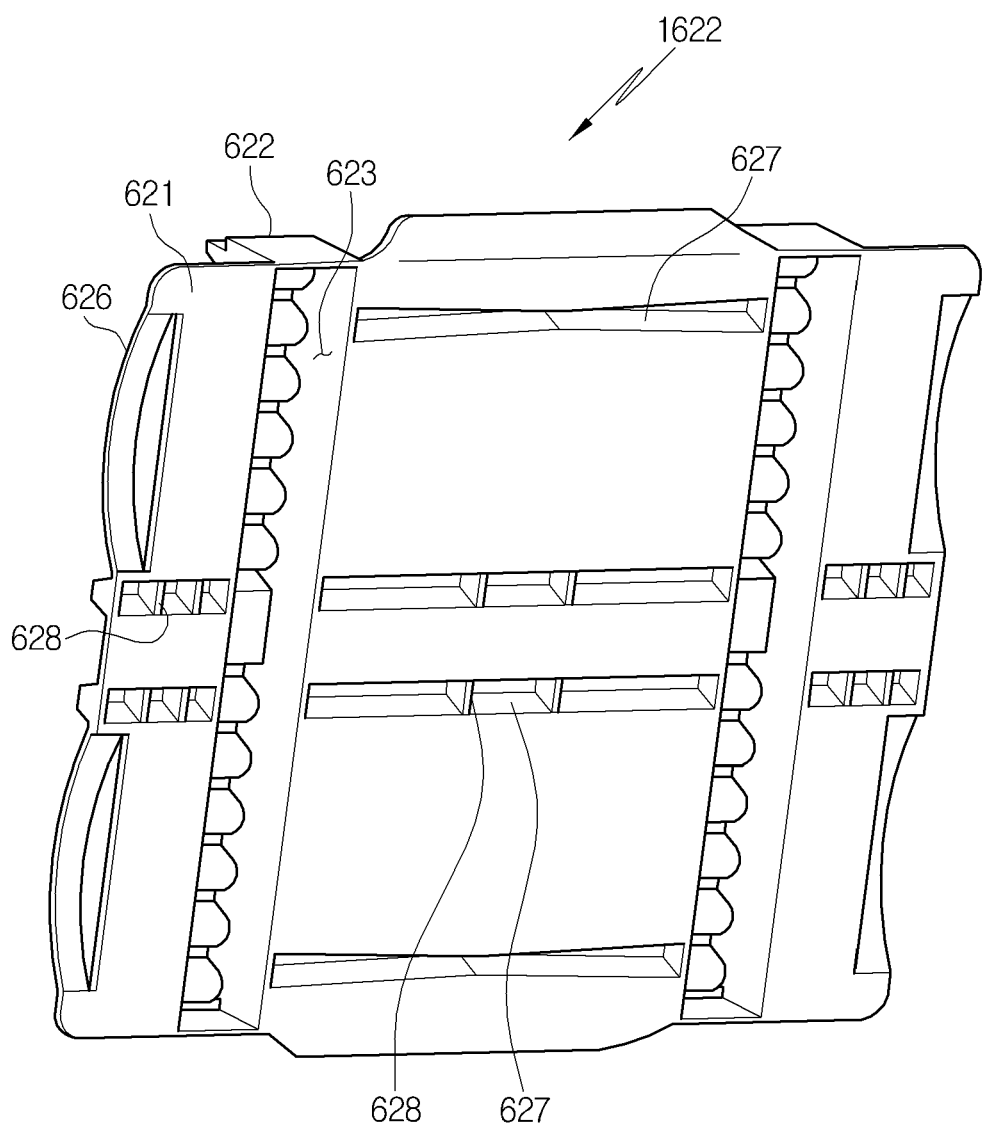
FIG. 14 is a rear perspective view of FIG. 11.

FIG. 11 is a perspective view illustrating a lower center temperature door of the air conditioner for a vehicle according to another embodiment of the present invention, FIG. 12 is a plan view of FIG. 11, FIG. 13 is a side view of FIG. 11, and FIG. 14 is a rear perspective view of FIG. 11.

Referring to FIGS. 11 to 14 as a second embodiment, the gear parts of the shaft 168 are all formed in the same diameter. In this instance, the gear part of one door part engaged with the gear part of the shaft 168 protrudes toward the gear part of the shaft 168 compared to the gear part of the other doors. That is, the gear part of the lower center temperature door 1622 protrudes further toward the shaft 168 than the gear part of the lower left temperature door 1621 and the lower right temperature door 1623.

In detail, the lower center temperature door 1622 includes a flat plate part 621, a gear part 622, a first stiffness reinforcing part 623, second stiffness reinforcing parts 624 and 625, and a third stiffness reinforcing part 627. The flat plate part 621 is formed in a thin plate shape and forms a main body of the door. The gear part 622 is formed on one surface of the flat plate part 621 and is engaged with the gear part of the shaft 168. The gear part 622 is extended to a predetermined length to protrude toward the shaft 168.

The first stiffness reinforcing part 623 is formed at a position corresponding to the gear part 622 on the other surface of the flat plate part 621 having the gear part 622. The first stiffness reinforcing part 623 is recessed in parallel with the protruding direction of the gear part 622. The protruding gear part 622 of the first stiffness reinforcing part 623 has an empty structure shape so as to improve the stiffness of the temperature door which is a relatively thin plate (less than 1 T).

The second stiffness reinforcing parts 624 and 625 protrude from one surface of the flat plate part 621 in which the gear part 622 is formed, and are extended at right angles to the sliding direction which is the longitudinal direction of the gear part 622. A plurality of the second stiffness reinforcing parts 624 and 625 are formed horizontally across the gear part 622. A pair of the first and second reinforcing parts 624 and 625 can be formed at the center in the sliding direction of the door, and a pair of the first and second reinforcing parts 624 and 625 can be formed at an edge in the sliding direction of the door.

The third stiffness reinforcing part 627 is formed at a position corresponding to the second stiffness reinforcing parts 624 and 625 on the other surface of the flat plate part 621 on which the gear part 622 is formed. The third stiffness reinforcing part 627 is recessed in parallel with the protruding direction of the second stiffness reinforcing parts 624 and 625. The third stiffness reinforcing part 627 has a hollow structure in which the protruding second stiffness reinforcing parts 624 and 625 has an empty structure shape so as to improve the stiffness of the temperature door which is a relatively thin plate (less than 1 T).

A plurality of ribs 628 are provided in the recessed portion of the third stiffness reinforcing part 627 in a longitudinal direction (sliding direction) to further improve structural strength. Additionally, a spring part 626 is provided on both sides in the width direction of the flat plate part 621 in order to add tension of the door and to improve sliding operation and sealability.

As described above, the air conditioner for a vehicle according to the second embodiment of the present invention can maintain the existing layout by increasing only the height of the gear part of the door, compared to the first embodiment described above. That is, if the diameter of the gear part of the shaft is large, it may cause interference with the evaporator, or the weight increases due to an increase in the size of the gear part, and the operational torque of the actuator increases. However, the second embodiment of increasing only the height of the gear part of the door can solve such a problem.

Figure 15:
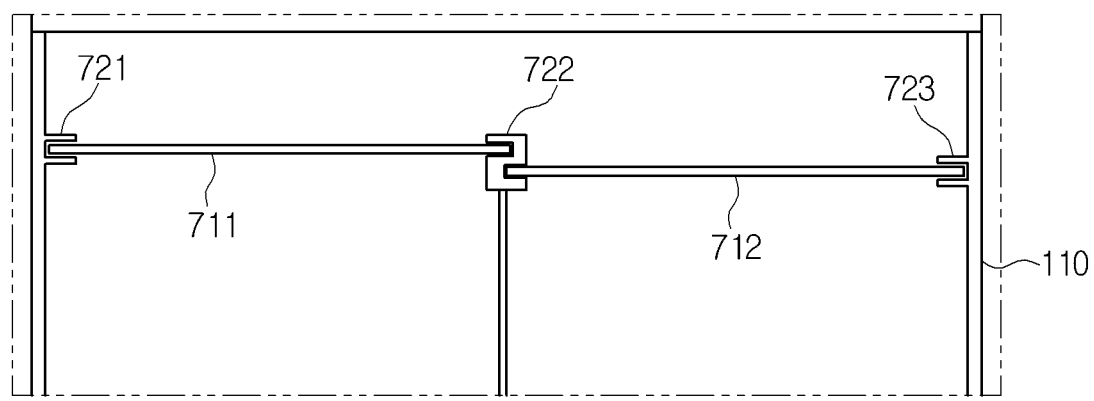
FIG. 15 is a plan sectional view illustrating the inside of the air conditioning case of an air conditioner for a vehicle according to a further embodiment of the present invention.

Meanwhile, FIG. 15 is a plan sectional view illustrating the inside of the air conditioning case of an air conditioner for a vehicle according to a further embodiment of the present invention. Referring to FIG. 15, if the air conditioner for a vehicle does not have three divided regions and three doors but has two divided regions and two doors, the support parts of the doors can be formed in two stages.

In other words, both ends of a first door 711 are slidably supported by a first support member 721 and a second support member 722, and both ends of a second door 712 are supported by a second support member 722 and a third support member 723. The second support member 722 is configured to partially overlap a support part of the first door 711 and a support part of the second door 712 so that the width of the internal passage of the air conditioning case 110 can be widened more.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

The invention claimed is:

1. An air conditioner for a vehicle comprising: an air conditioning case having an air passage formed therein; and a cooling heat exchanger and a heating heat exchanger provided in the air passage of the air conditioning case,
    wherein the air passage is divided into a plurality of regions, and comprises a plurality of doors for opening and closing each region and a shaft for respectively driving the doors,
    wherein a distance between one door and the shaft is different from a distance between the other doors and the shaft,
    wherein at least one of the plurality of regions supplies air to the rear seat region of the vehicle, and
    wherein the distance between the one door and the shaft for opening and closing the rear seat region is larger than the distance between the other doors and the shaft.

2. The air conditioner according to claim 1, wherein the internal air passage of the air conditioning case is horizontally divided into an upper passage and a lower passage by a partition wall so as to be formed in a two-layered flow, and is configured to perform an independent temperature control of three zones, comprise a rear seat region.

3. The air conditioner according to claim 2, wherein the upper passage is divided into an upper left passage and an upper right passage in a vehicle width direction by a first partition wall, and the lower passage is divided into a lower left passage and a lower center passage in the vehicle width direction by a second partition wall and a third partition wall, and the one door is provided in a lower center passage.

4. The air conditioner according to claim 3, wherein the air flowing through the lower center passage is discharged to at least one among a console vent and a rear seat floor vent for discharging air to the rear seat region of the vehicle.

5. The air conditioner according to claim 3, wherein an upper temperature door arranged in the upper passage and a lower temperature door arranged in the lower passage are disposed between the cooling heat exchanger and the heating heat exchanger,
    wherein the upper temperature door comprises an upper left temperature door for adjusting the opening degree of the upper left passage and an upper right temperature door for adjusting the opening degree of the upper right passage, and
    wherein the lower temperature door comprises a lower left temperature door for adjusting the opening degree of the lower left passage, a lower center temperature door for adjusting the opening degree of the lower center passage, and a lower right temperature door for adjusting the opening degree of the lower right passage.

6. The air conditioner according to claim 5, further comprising a support member for slidably supporting the door in the air passage of the air conditioning case,
    wherein the support member comprises a first support member, a second support member, a third support member, and a fourth support member, wherein the lower left temperature door is slidably provided between the first support member and the second support member, the lower center temperature door is slidably provided between the second support member and the third support member, and the lower right temperature door is slidably provided between the third support member and the fourth support member, and
    wherein the second support member and the third support member are configured such that the support parts of both doors are partially overlapped with each other.

7. The air conditioner according to claim 5, wherein the lower left temperature door, the lower center temperature door, and the lower right temperature door have the same width direction length, or the lower left temperature door and the lower right temperature door have the same width direction length.

8. An air conditioner for a vehicle comprising: an air conditioning case having an air passage formed therein; and a cooling heat exchanger and a heating heat exchanger provided in the air passage of the air conditioning case, wherein the air passage is divided into a plurality of regions, and comprises a plurality of doors for opening and closing each region and a shaft for respectively driving the doors, wherein a distance between one door and the shaft is different from a distance between the other doors and the shaft, further comprising support parts for respectively supporting the doors to be able to slide, wherein the support parts of the one door is partially overlapped with the support part of the other doors, wherein the doors are arranged in a vehicle width direction, and wherein the support part of the one door is disposed at a different position in a vehicle back-and-forth direction with respect to the support part of the other doors.

9. The air conditioner according to claim 8, wherein the one door is disposed in two or more stages in the vehicle back-and-forth direction with respect to the other doors.

10. The air conditioner according to claim 8, wherein an end portion of the one door is partially overlapped in the vehicle width direction with respect to an end portion of the other doors.

11. An air conditioner for a vehicle comprising: an air conditioning case having an air passage formed therein; and a cooling heat exchanger and a heating heat exchanger provided in the air passage of the air conditioning case, wherein the air passage is divided into a plurality of regions, and comprises a plurality of doors for opening and closing each region and a shaft for respectively driving the doors, wherein a distance between one door and the shaft is different from a distance between the other doors and the shaft, wherein the shaft has a gear part for transmitting driving power to the doors, and the gear part of the shaft for driving the one door is larger in diameter than the gear part of the shaft for driving the other doors.

12. An air conditioner for a vehicle comprising: an air conditioning case having an air passage formed therein; and a cooling heat exchanger and a heating heat exchanger provided in the air passage of the air conditioning case, wherein the air passage is divided into a plurality of regions, and comprises a plurality of doors for opening and closing each region and a shaft for respectively driving the doors, and wherein a distance between one door and the shaft is different from a distance between the other doors and the shaft, wherein the shaft has a gear part for transmitting driving power to the doors, and the gear part of the one door, which is engaged with the gear part of the shaft, protrudes further toward the gear part of the shaft than the gear part of the other doors.

13. The air conditioner according to claim 12, wherein the one door comprises:

a flat plate part formed in a plate shape;

a gear part formed on one surface of the flat plate part and engaged with the gear part of the shaft; and a first stiffness reinforcing part formed at a position corresponding to the gear part on the other surface of the flat portion having the gear part formed thereon and recessed in parallel with the protruding direction of the gear part.

14. The air conditioner according to claim 13, wherein the one door comprises:

at least one second stiffness reinforcing part protruding from one surface of the flat plate part, on which the gear part is formed, and extending at right angles to a sliding direction which is a longitudinal direction of the gear part; and a third stiffness reinforcing part formed at a position corresponding to the second stiffness reinforcing part on the other surface of the flat plate part having the gear part formed thereon, and formed to be recessed in parallel with the protruding direction of the second stiffness reinforcing part.

\* \* \* \* \*